Patented May 27, 1924.

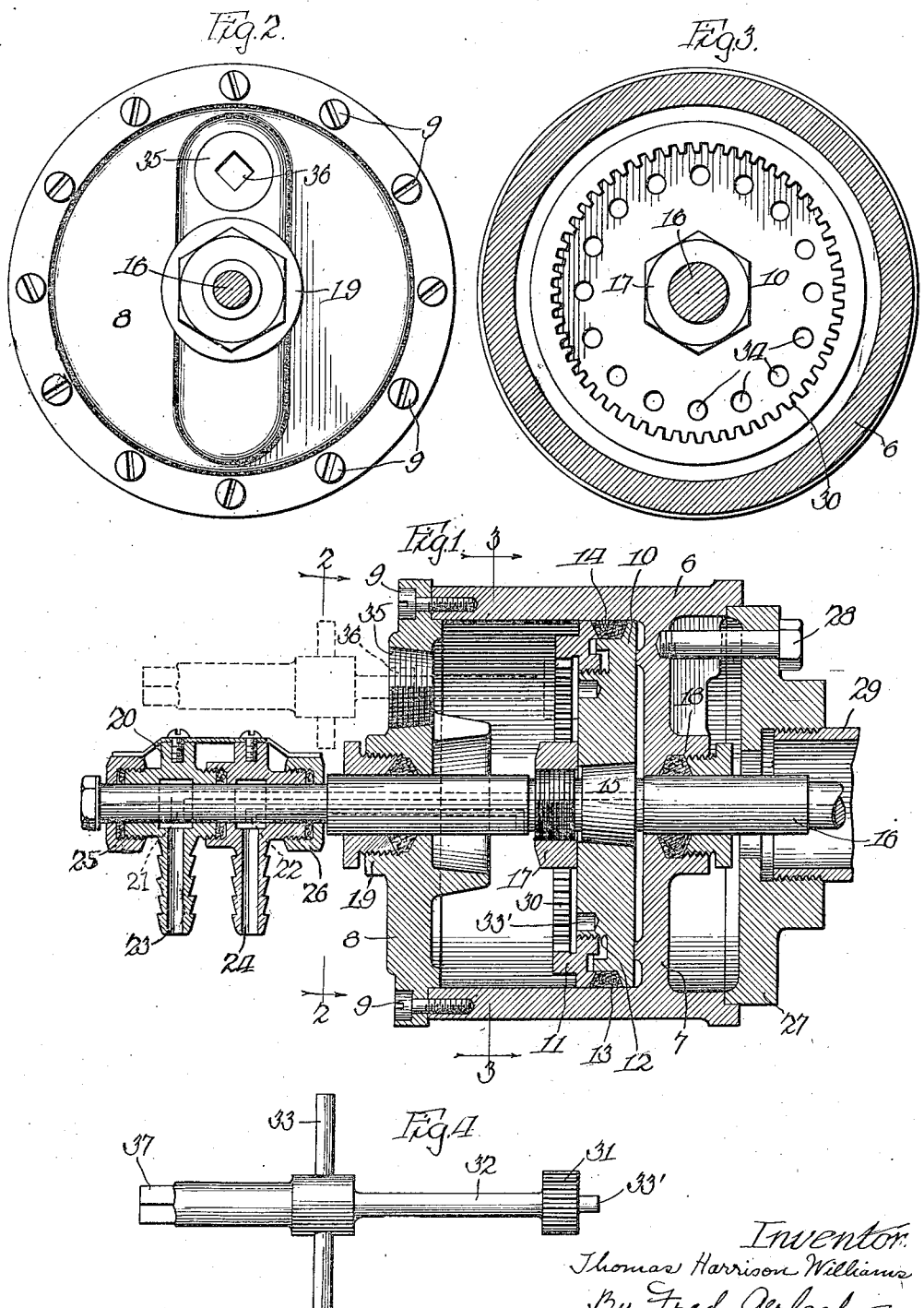

1,495,286

UNITED STATES PATENT OFFICE.

THOMAS HARRISON WILLIAMS, OF CICERO, ILLINOIS, ASSIGNOR TO MANUFACTURERS EQUIPMENT COMPANY, OF CHICAGO, ILLINOIS, A CORPORATION OF ILLINOIS.

FLUID-PRESSURE-OPERATED DEVICE.

Application filed February 23, 1923. Serial No. 620,744.

*To all whom it may concern:*

Be it known that I, THOMAS HARRISON WILLIAMS, a citizen of the United States and a resident of Cicero, in the county of Cook and State of Illinois, have invented certain new and useful Improvements in Fluid-Pressure-Operated Devices, of which the following is a full, clear, and exact description.

The invention relates to devices operated by fluid under pressure. It is now common to use cylinders with pistons therein for operating the jaws of a lathe-chuck or other devices and, in practice, it is frequently necessary to tighten the piston-packing to prevent leakage of air around it, particularly where high pressures are used. In constructions heretofore used, so far as I am aware, it has been necessary to dismantle the connections for supplying fluid to the cylinder and remove a cylinder-head to provide access to the piston so the packing in its periphery could be adjusted.

The primary object of the present invention is to provide a construction which makes it possible to facilitate the adjustment of the packing and in which it is not necessary to remove the cylinder-head or otherwise dismantle the structure to provide access to the packing-retaining means on the piston. Another object is to provide a quickly operable device for adjusting piston-packing.

The invention consists in the several novel features hereinafter set forth and more particularly defined by claims at the conclusion hereof.

In the drawings: Fig. 1 is a longitudinal section of a device embodying the invention. Fig. 2 is a section on line 2—2 of Fig. 1. Fig. 3 is a section on line 3—3 of Fig. 1. Fig. 4 is a detail of the adjusting tool.

The invention is exemplified in a structure comprising a cylinder adapted to retain air under pressure and a piston slidably mounted therein to operate the jaws of a chuck or other device. The cylinder has a body 6 formed with an integral head 7 at one end and a removable head 8 closes the other end of the cylinder, being secured to the body by screws 9. The piston, which is slidable in the cylinder, comprises a body 10 and a ring 11 connected by a screw-thread 12 to the body. An inwardly convergent annular groove 13 is formed between the ring and the body for a ring of packing 14 which fits in the grooves and is adapted to fit snugly against the inner periphery of the cylinder. By turning the ring 11 to bring the co-acting faces of the ring and body 10 together, the packing will be compressed and forced outwardly against the cylinder to compensate for wear and prevent leakage of air around the piston. The piston is secured on a tapered shoulder 15 of a shaft 16 by a nut 17 which is screw-threaded to said shaft. One end of the shaft 16 extends through a packing-box 18 in cylinder-head 7 to a point where it is to operate the jaws of a lathe-chuck or other device, and its other end extends through a packing-box 19 in the removable cylinder head 8 for connection to a coupling 20, which is connected to a source of air under pressure and delivers air to ports 21 and 22. Port 21 terminates at the inner side of the piston to deliver air to and from the outer end of the cylinder. Coupling 21 is provided with nipples 23, 24 for connection by suitable pipes to the devices for controlling the flow of air to and from the cylinder, as well understood in the art, and with packing-boxes 25, 26 to prevent leakage of air between it and the shaft. The cylinder 6 has secured thereto by bolts 28, a head 27, which may be connected to the chuck-head or other devices, by a sleeve 29. As well understood in the art, the operation of the piston in one direction by air under pressure in one end of the cylinder will operate shaft 16 to perform some function, such as the closing of the chuck jaws, and its operation by air under pressure in the other end of the cylinder will reversely operate the shaft to open the jaws. The cylinder and piston are adapted to be rotated together when used in a lathe, as also understood in the art.

In practice, it is necessary to keep the packing 14 tight in the cylinder to keep the pneumatic chuck in efficient condition and, therefore it is desirable to have a construction by which the packing may be quickly and readily adjusted. For this purpose, there is provided an annular series of internal gear teeth 30 on ring 11 which are adapted to be engaged and rotated by a pinion 31 on a tool comprising a shank 32, a handle or arms 33 and a stud 33' adapted to fit into any of an annular series of sockets 34 in the outer face of piston 10. An opening, for the insertion of the pinion 31 of the tool into the cylinder through piston-head 8, is formed in said head. A removable tapered plug 35 is screw-threaded to said head to normally close said opening.

When the plug is removed from the head, the pinion 31 and stud 33' may be passed through the head and slipped into engagement with gear-teeth 30, and the stud inserted into a socket 34 aligned with said opening, so that the ring 11 may be turned by the tool relatively to the piston-body to adjust the packing 14 to the extent desired. In the adjustment of the packing, the socket 34 in which the stud 33' is held, serves as a fulcrum for the gear. The plug 35 is provided with a square socket 36 to receive a correspondingly shaped terminal 37 on the tool, so the latter may be used to remove and replace the plug as well as to adjust the packing.

Obviously, the invention makes it possible to readily and quickly adjust the piston-packing without removing a cylinder-head or otherwise dismantling the structure. It is only necessary to remove plug 35, insert the tool and adjust the ring 11 and replace the plug, to effect the adjustment of the packing.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fluid-pressure operated device, the combination with a cylinder, of a piston movable in said cylinder provided with a ring rotatable therein having teeth whereby it may be rotated relatively to the piston, and means to engage the piston and adapted to rotate the ring, said means being removable from the piston when not in use.

2. In a fluid-pressure operated device, the combination with a cylinder, of a piston movable in said cylinder provided with a ring rotatable thereon having a series of internal gear-teeth whereby it may be rotated relatively to the piston, and fulcrum-means for a tool, so that a tool with a pinion may be fulcrumed on the piston and rotate the ring.

3. In a fluid-pressure operated device, the combination with a cylinder, of a piston movable in said cylinder provided with a ring rotatable thereon, having a series of internal gear-teeth whereby it may be rotated relatively to the piston, and a series of sockets in one of its faces, so that a tool with a pinion may be fulcrumed on the piston and rotate the ring.

4. In a fluid-pressure operated device, the combination of a cylinder having an opening therein and a removable closure for said opening, of a piston movable in the cylinder and provided with a ring rotatable thereon, gear-teeth on the ring, and a tool insertable into the cylinder through said opening and adapted to mesh with the gear and rotate said ring.

5. In a fluid-pressure operated device, the combination of a cylinder having an opening therein and a removable closure for said opening, of a piston movable in the cylinder and provided with a ring rotatable thereon, fulcrum means, gear-teeth on the ring, and a tool insertable through said opening and adapted to mesh with said gear and to engage said fulcrum-means to rotate the ring.

6. In a fluid-pressure operated device, the combination with a cylinder having a head at one end which is provided with an opening, means to removably close said opening, of a piston movable in said cylinder and provided with a ring having an annular series of teeth whereby a tool insertable through said opening and adapted to mesh with the teeth may rotate the ring.

7. In a fluid-pressure operated device, the combination with a cylinder having a head at one end which is provided with an opening, means to removably close said opening, of a piston movable in said cylinder and provided with a ring, having an internal annular series of teeth, whereby a tool insertable through said opening and adapted to mesh with the teeth may rotate the ring.

8. In a fluid-pressure operated device, the combination with a cylinder having a head at one end which is provided with an opening, means to removably close said opening, of a piston movable in said cylinder and provided with a ring having an annular series of teeth, and fulcrum-means whereby a tool insertable through said opening and adapted to engage the teeth and to engage said means may rotate the ring.

9. In a fluid-pressure operated device, the combination with a cylinder having a head at one end which is provided with an opening, means to removably close said opening, of a piston movable in said cylinder and provided with a ring having an annular series of teeth, and a series of sockets whereby a tool with a pinion and a stud may be inserted through said opening to engage the gear and a socket, and rotate the ring.

Signed at Chicago, Illinois this 15th day of February, 1923.

THOMAS HARRISON WILLIAMS.